United States Patent [19]

Traver

[11] Patent Number: 4,525,502

[45] Date of Patent: Jun. 25, 1985

[54] WATER BASED RESIN EMULSIONS

[75] Inventor: Frank J. Traver, Troy, N.Y.

[73] Assignee: General Electric Company, Waterford, N.Y.

[21] Appl. No.: 491,795

[22] Filed: May 5, 1983

[51] Int. Cl.$^3$ .................. C08K 5/17; C08L 83/06; C09D 3/82; C09D 5/02

[52] U.S. Cl. ............................ 524/96; 524/238; 524/300; 524/318; 524/588; 524/99; 106/287.14

[58] Field of Search .............. 524/588, 318, 300, 238, 524/96, 99; 106/287.14

[56] References Cited

U.S. PATENT DOCUMENTS

| | | | |
|---|---|---|---|
| 2,588,366 | 3/1953 | Dennett | 524/588 |
| 2,666,685 | 1/1954 | Hommel | 106/287.14 |
| 3,493,424 | 2/1970 | Mohrlok | 524/588 |
| 4,028,339 | 6/1977 | Merrill | 260/46.5 R |
| 4,040,998 | 8/1977 | Nemeth | 524/238 |
| 4,052,331 | 10/1977 | Dumoulin | 252/312 |
| 4,056,492 | 11/1977 | Merrill | 260/18 S |

FOREIGN PATENT DOCUMENTS

| | | | |
|---|---|---|---|
| 621510 | 6/1961 | Canada | 524/588 |
| 2609157 | 9/1976 | Fed. Rep. of Germany . | |

OTHER PUBLICATIONS

Chemical Abstracts 77:36,246P Jones, 1977.

Primary Examiner—C. Warren Ivy

[57] ABSTRACT

Water-based silicone resin emulsions are provided comprising an organopolysiloxane resin or mixture of resins which may include a solvent carrier, and a single emulsifying agent comprising the reaction product of an aliphatic carboxylic acid and an amine or ammonia as well as an amount of water sufficient for providing a water-based emulsion having a desired silicone resin solids content by weight.

35 Claims, No Drawings

WATER BASED RESIN EMULSIONS

BACKGROUND OF THE INVENTION

This invention relates to water-based emulsions of organopolysiloxane resins which are useful in coating applications where aqueous emulsions are preferable over traditional organic solvent based systems. The present invention provides both water-based silicone emulsions as well as methods for producing such compositions.

Silicone resins are often selected for applications requiring premium properties. These organopolysiloxane resins are known to offer outstanding endurance to environmental conditions such as weathering and extreme heat and cold. Silicone resins have found utility in a variety of applications such as pressure sensitive adhesives and release coatings. Furthermore, they have been found to be particularly useful in the paint industry which is continually seeking coating formulations which offer premium properties. Silicone resin solutions have previously been used in the paint coatings industry as vehicles and binders which are a necessary part of quality paint formulations.

Heretofore silicone resins were ordinarily supplied to formulators in solutions, that is to say, the resin consisted of so many parts by weight of silicone solids in some organic solvent such as xylene or toluene. However, recently the use of such organic solvents has been discouraged due to escalating costs for organic materials and increased concern for environmental considerations. Organic solvent based silicone resins often required the use of costly and cumbersome pollution abatement procedures and equipment. Thus there has been a trend in recent years for silicone resin systems which are water-based and therefore not dependent upon organic solvents.

However, such silicone resins which have been found to have particular utility in the art of paints and other coatings have often been immiscible or otherwise incompatible with aqueous coating systems. The present invention provides for the first time silicone resins which can be readily dispersed into water-based emulsion compositions thereby providing the beneficial properties of silicone resins without the cumbersome necessity of unduly large amounts of organic solvents.

As noted above, silicone resins are intended as high performance coating vehicles which can be used in high temperature-resistant coatings and will generally outperform conventional organic resins in similar applications. Those skilled in the art will recognize that there are a number of silicone resins which can be utilized in coating applications. Those silicon resins provided in U.S. Pat. Nos. 4,028,339 and 4,056,492 (both issued to Merrill) are examples of resins which can be made part of the water-based emulsion compositions of the present invention. Both of these patents are hereby incorporated by reference.

Previously known silicone resin emulsions have been successfully utilized in coating glass fabric, however, such compositions require the use of nonionic emulsifiers such as alkylphenoxy polyethoxyethanol. In such a system there is generally required approximately one part emulsifier for each nine parts of resin solids. When this type of emulsion technology is attempted in conjunction with the resin coating formulations discussed herein, as required by paint formulators, residual emulsifier is entrained in the coating and has a significant deleterious effect on such coatings at elevated temperatures. Mention is also made of the emulsions disclosed in Dumoulin U.S. Pat. No. 4,052,331. The emulsifying agent is a three-component combination of a nonionic, an anionic, and the reaction product of an aliphatic monocarboxylic acid and an amine. It is disclosed that at least one and preferably both of the latter two types are essential, because if a single nonionic is used, the emulsions are unstable, and will break, and form gels (Col. 8, lines 59–66 and Col. 9, lines 20–29). This patent is incorporated herein by reference.

The present invention, on the other hand, utilizes an emulsion system based upon a single type only as an emulsifier and this is the reaction product of a carboxylic acid and an amine. The total emulsifier requirement for the emulsions of the present invention is generally in the range of approximately 0.5 to 50 percent based upon the weight of the silicone resin solids. They suffer no tendency to break or gel as seen in some aforementioned emulsions. Furthermore, the reduction in the total types of emulsifier permits silicone resins to be emulsified more conveniently. Additionally, it seems that the use of the single emulsifier type is uniquely suitable to prepare water-based compositions to coat out more uniformly as compared to the above-described emulsions utilizing nonionic emulsifiers, as will be demonstrated hereinafter. Solid silicone resins seem to be particularly efficiently emulsified with the single emulsifier used herein.

It is therefore a primary object of the present invention to provide water-based emulsions of organopolysiloxane resins which are useful in coating formulations.

It is another object to provide an emulsifier system comprising a single emulsifier which is surprisingly effective for dispersing silicone resins, especially solid such resins, in a water-based coating system.

It is another object to provide a process for producing water-based silicone resin emulsions.

These and other objects will become apparent to those skilled in the art upon consideration of the accompanying description and claims.

SUMMARY OF THE INVENTION

The water-based silicone emulsions of the present invention are comprised of (a) 100 parts by weight of at least one organopolysiloxane resin composition consisting approximately of zero to 50 percent by weight of monofunctional units having the general formula $R_3SiO_{0.5}$, zero to 60 percent by weight difunctional units of the formula $R_2SiO$, zero to 100 percent by weight trifunctional units having the general formula $RSiO_{1.5}$, and zero to 60 percent by weight tetrafunctional units having the general formula $SiO_2$. In the above formulae R represents a substituted or unsubstituted monovalent hydrocarbon radical which will ordinarily be selected from the group consisting of, independently, methyl, hexyl and phenyl radicals. The organopolysiloxane resins utilized in the present invention will ordinarily have an R to Si ratio of, approximately, 1.0 to 1.99 R groups for each silicon atom. It is to be understood that the present invention contemplates the use of blends of different organopolysiloxane resins in the present emulsions as well as the use of a single type resin for each emulsion.

A more particular example of organopolysiloxane resins which are useful in the emulsions of the present inventions are those comprised of, approximately, 50 to 90 percent by weight $CH_3SiO_{1.5}$ units, zero to 15 percent $(CH_3)_2SiO$ units, and 5 to 15 percent $(C_6H_{13})SiO_{1.5}$ units, wherein there is present, approximately, 1.0 to 1.8 organic radicals for each silicon atom.

It is to be noted that these organopolysiloxane resins can be emulsified in water through the process described in the present invention. However, it is common in the art of silicone resins that such resins be provided in solutions consisting of some specified weight percent silicone resin solids based upon the weight of said silicone solids and the solvent. For example, the silicone resin may be provided as an approximately 20 to 90 percent by weight silicone resin solution in an organic solvent such as toluene or xylene. It is to be noted that this organic solvent, if present, is not a critical component of the present invention nor does it ordinarily detract in any way from the useful properties of these water-based silicone emulsions. Indeed, often the presence of small amounts of organic solvents in such emulsions impart otherwise beneficial properties to such emulsions.

The water-based emulsions of the above-described silicone resins are provided by utilizing a single type of emulsifying agent. The amount of emulsifying agent required to emulsify each 100 parts by weight resin solids will vary widely depending upon process conditions and the selection of the remaining constituent ingredients of the emulsion. Those skilled in the art will be able to produce a variety of water-based silicone resin emulsions according to the method set forth herein, and will be able to adjust the amount of emulsifying agent according to individual desires. Without intending to limit the scope of the present invention in any way, it will ordinarily be the case that, approximately, 0.25 to 50 parts by weight of the specified emulsifying agent will be necessary to produce the water-based silicone resin emulsions of the present invention. It has been discovered by the present invention that a particular type of emulsifying agent is effective for dispersing these silicone resins and thereby providing water-based emulsions. The emulsifying agent is comprised of the reaction product of a $C_6$-$C_{30}$ aliphatic monocarboxylic acid and a primary, secondary or tertiary amine or ammonia. Particular examples of each of this type of emulsifier are given later in the specification. When an effective amount of such emulsifying agent is combined with the organopolysiloxane resins in the presence of water, a water-based silicone resin emulsion can be provided through the utilization of well known emulsification techniques such as colloid milling. The amount of water present is not critical and will ordinarily depend upon the application to which the emulsion will be put. The amount of water is merely dependent upon a desire to provide a preselected silicone resin solids content by weight in the resulting emulsion. As stated, although the amount of water is not critical there will ordinarily be approximately 50 to 2000 parts by weight of this water per 100 parts of the organopolysiloxane resin.

The process of the present invention provides the above described water based silicone resin emulsion compositions by combining the specified constituent ingredients and then applying well known emulsification techniques.

DESCRIPTION OF THE INVENTION

Silicone resins which may be used in the compositions of the present invention may be prepared by a number of well known processes such as, for example, by hydrolyzing an organohalosilane blend wherein the composition of the resin can be varied by changing the proportions of the constituent organohalosilanes to be hydrolyzed. An exemplary resin might start with a blend of about 60 mole percent methyltrichlorosilane, about 35 mole percent of phenyltrichlorosilane and about 5 mole percent of dimethyldichlorosilane in the presence of water, acetone and a water-immiscible organic solvent. In general, this hydrolysis medium could contain from about 1.7 parts to 10 parts of water, 0.2 to 5 parts of acetone and 0.3 to 5 parts of said water-immiscible organic solvent per part by weight of the silane blend.

The various components of the hydrolysis mixture can be added concomitantly or separately in any desired order. Generally, the organohalosilanes are added to the mixture of water, acetone and organic solvent. Preferably, when this method is used a proportion of from 2 to 6 parts of water, about 0.3 to about 2 parts of acetone, and about 0.6 to about 2 parts of organic solvent, per part of the total weight of organohalosilane blend, is employed. It is preferred that the organohalosilanes are added to the hydrolysis medium, rather than vice versa, as this limits the concentration of hydrochloric acid which is formed during the hydrolysis reaction. A strong hydrochloric acid solution is undesirable in this example as the hydrochloric acid causes acid polymerization of the acetone forming polymerization products which add undesirable color to the product and have a deleterious effect on the physical properties of the product.

A preferred method to prepare organopolysiloxane resins which may be used in this invention is the dual feed process. The dual feed process comprises feeding the blend of organohalosilanes and from about 0.9 to 5 parts, preferably 0.9 to 1.2 parts of acetone from separate containers and through separate conduits, then premixing them immediately prior to hydrolysis. It is necessary to limit the contact time if small amounts of water are present in the acetone or in the atmosphere in contact with the organohalosilanes, as the water present causes hydrolysis of the organohalosilanes generating acid which causes the acetone to polymerize. The initial hydrolysis medium prior to the introduction of the silane blend-acetone mixture contains from about 0 to 4.1 parts of acetone and preferably from 0.9 to 1.2 parts of acetone. The amount of water and organic solvent can be set forth hereinabove, with preferably from about 3 to 3.5 parts of water and 0.9 to 1.2 parts of organic solvent per part of organohalosilanes.

The temperature of the hydrolysis mixture can be controlled by the rate of addition of the reagents, or by external heat or by cooling if desired. During hydrolysis, a temperature of between about 20° C. to about 40° C. is preferred. After the addition of all the reagents is completed, the mixture is generally agitated for an additional period of time such as 15 to 30 minutes or more to allow for complete hydrolysis of the organohalosilanes. The mixture is then allowed to settle and the acid aqueous (bottom) layer is drawn off from the organic layer. Depending upon individual desires, the organic layer can then be stripped of solvent to a solids concentration of up to 100%. The organic solvent may be stripped under reduced pressure or atmospheric pressure. At this point, the resin may be bodied, i.e., built-up in molecular weight, under total reflux, by condensing and cross-linking silanol units, with the aid of, for example, a catalyst such as iron octoate or Celite (diatomaceous earth) or mixtures thereof, to a desired viscosity, preferably 5–12 cps. at 25° C. by weight resins solids. Moreover, resin impurities may be removed by filtration, using, for example, filtering aids such as Celite 545 (diatomaceous earth, sold by Johns Manville), Fuller's earth (calcium montmorillonite), and mixtures of the same, or simply by centrifugation. The resulting silanol-containing organopolysiloxane resin has an organo radical to silicon ratio of about 1.05 to 1.

Included among the water-immiscible organic solvents used in the above-described process for providing silicone resins are, for example, hydrocarbons such as benzene, toluene, xylene and the like; esters such as butyl acetate, ethyl acetate, ethers such as diethylether and the like. Toluene is most preferred because it is a good solvent and has a low boiling point. In general, however, any water-immiscible organic solvent, which is inert to the hydrolysis reactants during hydrolysis and in which the hydrolyzate is soluble to provide for its separation from the aqueous layer, may be used.

Of course, through the process provided by the present invention it is now possible to disperse these heretofore water-immiscible resins in aqueous media.

The required single type of emulsifying agents are reaction products of $C_6$–$C_{30}$ aliphatic carboxylic acids and amines or ammonia. Illustrative of the acids are straight and branched chain hydrocarbon acids the hydrocarbon portion of which can be saturated or olefinically unsaturated. Typical examples are capric acid, caprylic acid, oleic acid, stearic acid, linoleic acid, lauric acid, palmitic acid, linolenic acid, and the like. Preferred is oleic acid. The amines used can vary widely, and will include, e.g., primary, secondary and tertiary amines and ammonia, the substituents being the same or different and selected from, e.g., hydrogen, $C_1$–$C_{30}$ alkyl groups, aryl groups, substituted aryl groups, and the like. They can also be joined to form rings, such as alkylidene rings, and such rings interrupted with hetero atoms, e.g., —O— and —NH—. In other words, in addition to ammonia ($NH_3$), said primary, secondary and tertiary amines will have the general formula $H_aNR_b$, wherein a and b are positive integers from 1 to 3 and a+b=3, and wherein R is a monovalent hydrocarbon, halogenated hydrocarbon or heterocyclic radical of from 1 to 30 carbon atoms and can be, for example, alkyl, aryl, halogenated aryl, cycloalkyl, or saturated or unsaturated heterocyclic. Typical examples are ammonia; monomethyl amine, dimethylamine, trimethylamine, morpholine, piperidine, aniline, benzylamine, trioctadecylamine and the like. Ammonia or aqueous ammonium hydroxide are preferred. The reaction product used as emulsifying agent can be used in admixture, so long as a single type is used, e.g., ammonium oleate can be used with ammonium linoleate and morpholinium oleate can be used with ammonium oleate, etc. The reaction product can be generated in situ, e.g., by adding the individual components to the emulsification mixture or it can be preformed, and then added, without departing from the invention.

The water-based silicone resin emulsions of the present invention can be made by any of several methods. Ordinarily the order of addition of ingredients is not critical. One suitable method calls for the dispersion of the emulsifying agent in water with agitation and heat until the solids are dissolved. The water phase of the emulsion products can also be added in two, three or more parts, as desired. Those skilled in the art will be able to vary the proportion of the constituent ingredients in order to provide desirable resin emulsion formulations.

Additionally, optional ingredients such as formalin can be added to these emulsions depending upon a given desired end use without seriously detracting from the properties of the water-based emulsion. An example of a typical silicone resin which can be used in the emulsions and processes of the present invention is CR-132 which is available from the General Electric Company.

The composition to be emulsified will then be blended until uniform whereupon emulsification can be induced by colloid milling of the composition of by homogenization or blending of the composition.

A colloid mill found useful for producing laboratory quantities of these water-based resin emulsions is Manton-Gaulin Colloid Mill, Model 2A. Such a mill has a 40 mil gap which is adjustable from 1 to 40 mils and can be operated at atmospheric pressure or under a feed pressure or under a feed pressure of 5 to 40 psig $N_2$. Of course, it is contemplated that those skilled in the art will be able to scale up the process of the present invention in order to produce commercial quantities of these water-based silicone emulsions.

The organopolysiloxane resins which are utilized in the following examples are comprised primarily of trifunctional units of the formulae $CH_3SiO_{1.5}$ (T units) and $(C_6H_{13})SiO_{1.5}$ (T' units); and di-functional units of the formulae $(CH_3)_2SiO$ (D units).

In the description of the resin, mole percent silane values are given for the convenience of those skilled in the art. The mole percent siloxane value is indicative of the approximate number of each type of siloxane units present in an average resin molecule. The R to Si Ratio is an expression used by those skilled in the art to indicate the approximate relative number of organo radicals associated with each silicon atom and is a useful measure of the degree of tri- and di-functionality in such silicone resins.

DESCRIPTION OF THE PREFERRED EMBODIMENTS

In order to more fully and clearly describe the present invention, it is intended that the following examples be considered as illustrative rather than limiting the invention disclosed and claimed herein. All parts are by weight.

EXAMPLE 1

The silicone resin to be emulsified was a solid. The resin was the bodied resin hydrolysis product comprised of approximately, 82.5 mole % methyltrichlorosilane, 7.7 mole % dimethyldichlorosilane, and 9.5 mole % of hexyltrichlorosilane.

To 10 g. of the silicone resin there was added 0.5 g. of oleic acid. The oleic acid was totally soluble in the resin yielding a clear solution. Two grams of the resin-oleic acid solution was added to dilute ammonium hydroxide solution which consisted of 1 g. of 28% aqueous ammonia solution in 25 g. of water. The 2 oz. bottle containing resin-oleic acid solution and ammonium hydroxide solution was emulsified by shaking the bottle gently with wrist action. A stable emulsion was obtained, containing 5.4% resin solids.

EXAMPLE 2

An emulsion was prepared as follows:

| Formula | Percent |
| --- | --- |
| Silicone Resin (as in Example 1) | 50.0 |
| Oleic Acid | 2.52 |
| 28% Ammonium Hydroxide Solution | 0.7 |
| Water | 46.78 |
| | 100.00 |

The resin was blended with oleic acid for one-half hour. The water and ammonium hydroxide were blended in a separate container. The dilute ammonium hydroxide was then added to the silicone resin/oleic acid blend. The resulting premix was stirred for an hour, then colloid milled through a Manton Gaulin colloid mill using a 5 mil gap and atmospheric pressure. A stable emulsion containing 35.1% solids and having a 1200 cps. viscosity was obtained.

To demonstrate the unique suitability of the emulsifier according to this invention, for comparison purposes, the resin of Example 1 was emulsified with a nonionic surface active agent by blending 35 grams of the resin with 5 grams of an alkylaryl polyethyleneoxy ethanol (Rohm & Haas Triton X-100). The blend was then solubilized with Propasol D solvent and 5 grams of the solution was then dispersed in 45 grams of water, wrist action shaking. The emulsion of Example 1 and the comparative material were applied as 5% resin solid emulsions to cement block (masonry) samples with a paint brush. An application of the silicone resin out of a solvent solution (5% solids in mineral spirits) was also made. After one hour drying time, a drop of water was placed on each treated surface. The surface coated with the resin emulsified with a nonionic emulsifier showed poor water repellency. The surface control with the resin in the solvent showed good repellency. Surprisingly, the surface coated with the emulsion of Example 1 according to this invention was rated very good in its repellency. The water-based product of this invention performed better than either the solvent based, water free, solution or the nonionic emulsified resin.

Many variations will suggest themselves to those skilled in this art in light of the above-detailed description. For example, instead of the silicone resin employed in the example, there can be substituted the following resin hydrolysis products of: 25 mole % methyltrichlorosilane (T), 30 mole % of dimethyldichlorosilane (D), 25 mole % of phenyltrichlorosilane (T'), and 20 mole % of diphenyldichlorosilane (D'); 10 mole % of (T), 30 mole % of (D); 40 mole % of (T'); 20 mole % of (D'); and 30 mole % of (T); 20 mole % of (D), 30 mole % of (T') and 20 mole % of (D'). In addition the resins can be emulsified from an 80% solution in a solvent, e.g., toluene. Instead of ammonium oleate formed in situ, preformed material can be used. Instead of ammonium oleate, morpholinium stearate can be used. All such obvious modifications are within the full intended scope of the appended claims.

I claim:

1. A uniformly coatable water-based silicone resin emulsion comprising:
   (a) 100 parts by weight of at least one organopolysiloxane resin composition consisting essentially of zero to 50 percent by weight monofunctional units of the formula $R_3SiO_{0.5}$, zero to 60 percent by weight difunctional units of the formula $R_2SiO$, zero to 100 percent by weight trifunctional units of the formula $RSiO_{1.5}$, and zero to 60 percent by weight tetrafunctional units of the formula $SiO_2$ wherein R is a substituted or unsubstituted monovalent hydrocarbon radical and said organopolysiloxane resin has approximately 1.0 to 1.8 R groups for each silicon atom;
   (b) 0.25 to 50 parts by weight of a single emulsifying agent per 100 parts of said organopolysiloxane resin wherein said emulsifying agent is comprised of the salt of a $C_6$–$C_{30}$ monocarboxylic aliphatic acid and ammonia or a primary, secondary or tertiary amine of the formula $H_aNR'_b$, wherein a and b are positive integers from 1 to 3 and $a+b=3$, and wherein R' is a monovalent hydrocarbon, halogenated hydrocarbon or heterocyclic radical of from 1 to 30 carbon atoms, or a mixture of such salts, wherein said emulsifying agent is effective for dispersing said organopolysiloxane resin in a water-based emulsion; and
   (c) sufficient water to provide a stable aqueous emulsion.

2. A water-based silicone resin emulsion as in claim 1 wherein said water is present in an amount effective for providing an emulsion having a preselected silicone resin solids content by weight.

3. An emulsion as in claim 2 wherein said water is present in an amount of, approximately, 25 to 400 parts by weight per 100 parts of said organopolysiloxane resin.

4. An emulsion as in claim 1 further comprising zero to 500 parts by weight per 100 parts organopolysiloxane resin of an organic solvent.

5. An emulsion as in claim 4 wherein said organic solvent is selected from toluene, xylene, and benzene.

6. An emulsion as in claim 1 wherein said R radicals are selected from, independently, the group consisting of methyl, hexyl and phenyl radicals.

7. An emulsion as in claim 1 wherein said organopolysiloxane resin is comprised of, approximately, 50 to 90 percent by weight $CH_3SiO_{1.5}$ units, zero to 15 percent $(CH_3)_2 SiO$ units, and 5 to 15 percent $(C_6H_{13})SiO_{1.5}$ units, and wherein there is present, approximately, 1.0 to 1.8 organic radicals for each silicon atom.

8. An emulsion as in claim 1 wherein said salt is one or a mixture of the reaction products of a monocarboxylic acid selected from oleic acid, stearic acid, linoleic acid, lauric acid, palmitic acid, linolenic acid, capric acid or caprylic acid, with an amine selected from ammonia, morpholine, or triethanolamine.

9. A process for providing a uniformly coatable water-based silicone resin emulsion comprising the steps of
I. combining
   (a) 100 parts by weight of at least one organopolysiloxane resin composition consisting essentially of zero to 50 percent by weight monofunctional units of the formula $R_3SiO_{0.5}$, zero to 60 percent by weight difunctional units of the formula $R_2SiO$, zero to 100 percent by weight trifunctional units of the formula $RSiO_{1.5}$, and zero to 60 percent by weight tetrafunctional units of the formula $SiO_2$, wherein R is a substituted or unsubstituted monovalent hydrocarbon radical and said organopolysiloxane resin has approximately 1.0 to 1.8 R groups for each silicon atom;
   (b) 0.25 to 50 parts by weight of a single emulsifying agent per 100 parts by said organopolysiloxane resin wherein said emulsifying agent is comprised of the salt of a $C_6$–$C_{30}$ aliphatic monocarboxylic acid and ammonia or a primary, secondary or tertiary amine of the formula $H_aNR'_b$, wherein a and b are positive integers from 1 to 3 and a+b equals 3, and wherein R' is a monovalent hydrocarbon, halogenated hydrocarbon or heterocyclic radical of from 1 to 30 carbon atoms, or a mixture of such salts, wherein said emulsifying agent is effective for dispersing said organopolysiloxane resin in a water-based emulsion; and (c) sufficient water to provide a stable aqueous emulsion.

10. A process as in claim 9 wherein said emulsifying step is accomplished by colloid milling.

11. A process as in claim 9 further comprising the step of preblending said emulsifying agent or a portion thereof with a portion of said water prior to combining said emulsifying agent with said organopolysiloxane resin and a remaining portion of water.

12. A process as in claim 9 wherein said water is present in an amount effective for providing an emulsion having a preselected silicone resin solids content by weight.

13. A process as in claim 12 wherein said water is present in an amount of, approximately, 25 to 400 parts by weight per 100 parts of said organopolysiloxane resin.

14. A process as in claim 9 further comprising the step of adding zero to 500 parts by weight per 100 parts organopolysiloxane resin of an organic solvent per 100 parts organopolysiloxane resin.

15. A process as in claim 14 wherein said organic solvent is selected from toluene, xylene and benzene.

16. A process as in claim 9 wherein said R radicals are selected from, independently, the group consisting of methyl, hexyl and phenyl radicals.

17. A process as in claim 9 wherein said organopolysiloxane resin is comprised of, approximately, 50 to 90 percent by weight $CH_3SiO_{1.5}$ units, zero to 15 percent $(CH_3)_2SiO$ units, and 5 to 15 percent $(C_6H_{13})SiO_{1.5}$ units, wherein there is present, approximately 1.0 to 1.8 organic radicals for each silicon atom.

18. A process as in claim 9 wherein said carboxylic acid is selected from oleic acid, stearic acid, linoleic acid, palmitic acid, linolenic acid, capric acid or caprylic acid and said amine is selected from ammonia, morpholine, triethanolamine.

19. A water-based silicone resin emulsion waterproofing masonry coating comprising:

(a) 100 parts by weight of at least one organopolysiloxane resin composition consisting essentially of zero to 50 percent by weight monofunctional units of the formula $R_3SiO_{0.5}$, zero to 60 percent by weight difunctional units of the formula $R_2SiO$, zero to 100 percent by weight trifunctional units of the formula $R SiO_{1.5}$, and zero to 60 percent by weight tetrafunctional units of the formula $SiO_2$, wherein R is a monovalent hydrocarbon radical and said organopolysiloxane resin has approximately 1.0 to 1.8 R groups for each silicon atom;

(b) 0.25 to 50 parts by weight, per 100 parts of said organopolysiloxane resin, of a single emulsifying agent comprising (i) a $C_6$-$C_{30}$ monocarboxylic aliphatic acid and ammonia or a primary, secondary or tertiary amine of the formula $H_aHR'_b$, wherein a and b are positive integers from 1 to 3 and a+b=3, and wherein R' is a monovalent hydrocarbon, halogenated hydrocarbon of heterocyclic radical of from 1 to 30 carbon atoms, or (ii) the salt of said monocarboxylic aliphatic acid and said amine or ammonia; and (c) sufficient water to provide a stable aqueous emulsion.

20. A masonry coating as in claim 19 wherein said water is present in an amount of about 50 to 2,000 parts by weight per 100 parts of the organopolysiloxane resin component.

21. A masonry coating as in claim 19 which further comprises up to 500 parts by weight, per 100 parts organopolysiloxane resin, of an organic solvent.

22. A masonry coating as in claim 21 wherein said organic solvent is selected from toluene, xylene, and benzene.

23. A masonry coating as in claim 19 wherein radicals represented by R are selected from, independently, methyl, hexyl and phenyl radicals.

24. A masonry coating as in claim 19 wherein said organopolysiloxane resin in composed of, approximately, 50 to 90 percent by weight $CH_3SiO_{1.5}$ units, zero to 15 percent by weight $(CH_3)_2SiO$ units, and 5 to 15 percent $(C_6H_{13})SiO_{1.5}$ units, and wherein the ratio of organic radicals to silicon atoms is approximately 1.0 to 1.8.

25. A water-based silicon resin emulsion waterproofing masonry coating comprising:

(a) 100 parts by weight of at least one organopolysiloxane resin consisting essentially of up to 50 percent by weight $R_3SiO_{0.5}$ units, up to 60 percent by weight $R_2SiO$ units, up to 100 percent by weight $R SiO_{1.5}$ units, and up to 60 percent by weight $SiO_2$ units, wherein R is selected from the group consisting of methyl, hexyl and phenyl and the ratio of R radicals to Si atoms is approximately 1.0 to 1.8;

(b) 0.25 to 50 parts by weight, per 100 parts by weight of said organopolysiloxane resin, of a single emulsifying agent comprising one or more salts of (i) a monocarboxylic acid and (ii) a primary, secondary or tertiary amine or ammonia, or comprising a combination of said monocarboxylic acid (i) and said amine or ammonia (ii), wherein said monocarboxylic acid is selected from the group consisting of capric acid, caprylic acid, oleic acid, stearic acid, linoleic acid, lauric acid, palmitic acid, and linolenic acid, and said amine is selected from the group consisting of monomethyl amine, dimethyl amine, trimethyl amine, morpholine, piperidine, aniline, benzylamine, trioctadecylamine, triethanolamine, and ammonium hydroxide; and (c) approximately 50 to 2,000 parts by weight water, per 100 parts of said organopolysiloxane resin.

26. A masonry coating as defined in claim 25 which further comprises up to 500 parts by weight, per 100 parts organopolysiloxane resin, of an organic solvent selected from toluene, xylene or benzene.

27. A masonry coating as in claim 25 wherein said emulsifying agent is one or more salts selected from the group consisting of ammonium oleate, ammonium linoleate, morpholinium oleate and morpholinium stearate.

28. A process for providing a water-based silicone resin emulsion masonry coating comprising the steps of I. combining:

(a) 100 parts by weight of at least one organopolysiloxane resin composition consisting essentially of zero to 50 percent by weight monofunctional units of the formula $R_3SiO_{0.5}$, zero to 60 percent by weight difunctional units of the formula $R_2SiO$, zero to 100 percent by weight trifunctional units of the formula $R\ SiO_{1.5}$, and zero to 60 percent by weight tetrafunctional units of the formula $SiO_2$ wherein R is a monovalent hydrocarbon radical and said organopolysiloxane resin has approximately 1.0 to 1.8 R groups for each silicon atom;

(b) a $C_6-C_{30}$ aliphatic monocarboxylic acid;

II. Adding the combination of an aqueous solution of ammonia or a primary, secondary or tertiary amine of the formula $H_aNR'_b$, wherein a and b are positive integers from 1 to 3 and $a+b=3$, and wherein R' is a monovalent hydrocarbon, halogenated hydrocarbon or heterocyclic radical of from 1 to 30 carbon atoms, and wherein said monocarboxylic acid and said amine or ammonia are present in sufficient amounts to provide 0.25 to 50 parts by weight, per 100 parts by weight of organopolysiloxane resin, in combination, and sufficient water is present to provide 50 to 2,000 parts by weight, per 100 parts by weight of organopolysiloxane resin; and III. Mixing the product of steps I. and II. until a stable, uniformly coatable emulsion is obtained.

29. The process of claim 28 wherein said organopolysiloxane resin is comprised primarily of trifunctional units of the formulae $CH_3SiO_{1.5}$ and $(C_6H_{13})SiO_{1.5}$, and difunctional units of the formula $(CH_3)_2SiO$; said monocarboxylic acid is selected from the group consisting of stearic acid, oleic acid, linoleic acid, palmitic acid, linolenic acid, capric acid and caprylic acid; and said amine or ammonia is selected from the group consisting of morpholine, triethanolamine, monomethyl amine, dimethyl amine, trimethyl amine, piperidine, aniline, benzylamine, trioctadecylamine and ammonia.

30. A water-based silicone resin emulsion consisting essentially of:

(a) 100 parts by weight of at least one organopolysiloxane resin composition consisting essentially of zero to 50 percent by weight monofunctional units of the formula $R_3SiO_{0.5}$, zero to 60 percent by weight difunctional units of the formula $R_2SiO$, zero to 100 percent by weight trifunctional units of the formula $R\ SiO_{1.5}$, and zero to 60 percent by weight tetrafunctional units of the formula $SiO_2$ wherein R is a substituted or unsubstituted monovalent hydrocarbon radical and said organopolysiloxane resin has approximately 1.0 to 1.8 R groups for each silicon atom;

(b) 0.25 to 50 parts by weight of a single emulsifying agent per 100 parts of said organopolysiloxane resin wherein said emulsifying agent is comprised of the salt of a $C_6-C_{30}$ monocarboxylic aliphatic acid and a primary, secondary or tertiary amine or ammonia, or a mixture of such salts, wherein said emulsifying agent is effective to disperse said organopolysiloxane resin in a water-based emulsion; and (c) sufficient water to provide a stable aqueous emulsion.

31. An emulsion as defined in claim 30, wherein said water is present in an amount of, approximately, 25–400 parts by weight per 100 parts of said organopolysiloxane resin.

32. An emulsion as defined in claim 30, which further comprises up to 500 parts by weight, per 100 parts organopolysiloxane resin, of an organic solvent selected from toluene, xylene or benzene.

33. An emulsion as defined in claim 30, wherein said R radicals are selected from, independently, methyl, hexyl and phenyl radicals.

34. An emulsion as defined in claim 30, wherein said organopolysiloxane resin is comprised of, approximately, 50–90 percent by weight $CH_3SiO_{1.5}$ units, 0–15 percent $(CH_3)_2SiO$ units, and 5–15 percent $(C_6H_{13})SiO_{1.5}$ units.

35. An emulsion as defined in claim 30, wherein said organopolysiloxane resin is comprised primarily of trifunctional units of the formulae $(C_6H_{13})SiO_{1.5}$, and difunctional units of the formula $(CH_3)_2SiO$; said monocarboxylic acid is selected from the group consisting of stearic acid, oleic acid, linoleic acid, palmitic acid, linolenic acid, capric acid and caprylic acid; and said amine or ammonia is selected from the group consisting of morpholine, triethanolamine, monomethyl amine, dimethyl amine, trimethyl amine, piperidine, aniline, benzylamine, trioctadecylamine and ammonia.

* * * * *